United States Patent
Ciccone et al.

(10) Patent No.: US 10,144,456 B1
(45) Date of Patent: Dec. 4, 2018

(54) STRUT-TOWER BRACE

(71) Applicant: FORD GLOBAL TECHNOLOGIES, LLC, Dearborn, MI (US)

(72) Inventors: Thomas Joseph Ciccone, Madison Heights, MI (US); Amol Kurane, Canton, MI (US); Ryan Delaney, Ypsilanti, MI (US); Samson Ng, Farmington Hills, MI (US); Peter Thai, White Lake, MI (US); Jamal Hameedi, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/655,058

(22) Filed: Jul. 20, 2017

(51) Int. Cl.
*B62D 25/08* (2006.01)

(52) U.S. Cl.
CPC ......... *B62D 25/088* (2013.01); *B62D 25/082* (2013.01); *B60G 2204/143* (2013.01); *B60G 2204/15* (2013.01); *B60G 2204/4302* (2013.01); *B62D 25/081* (2013.01)

(58) Field of Classification Search
CPC .... B62D 25/08; B62D 25/081; B62D 25/082; B62D 25/088; B60G 2204/143; B60G 2204/15; B60G 2204/4302
USPC ......... 296/192, 193.09, 203.02, 198, 187.09; 280/124.147
See application file for complete search history.

(56) References Cited

U.S. PATENT DOCUMENTS

| | | | |
|---|---|---|---|
| 6,547,281 B1 * | 4/2003 | Iwatsuki | B60G 11/16 280/781 |
| 7,404,596 B2 | 7/2008 | Miyata et al. | |
| 8,128,160 B2 | 3/2012 | Leanza et al. | |
| 9,868,471 B2 * | 1/2018 | An | B62D 25/082 |
| 2007/0246971 A1 * | 10/2007 | Hanakawa | B62D 25/081 296/203.01 |
| 2008/0185875 A1 * | 8/2008 | Joest | B62D 25/081 296/203.02 |
| 2009/0066116 A1 * | 3/2009 | Kuroita | B62D 25/081 296/193.09 |
| 2010/0320712 A1 * | 12/2010 | Leanza | B62D 25/082 280/124.134 |
| 2014/0130336 A1 * | 5/2014 | Trush | F16B 33/008 29/525.12 |
| 2015/0061325 A1 * | 3/2015 | Cho | B62D 25/082 296/193.09 |
| 2015/0076867 A1 * | 3/2015 | Bechtler | B62D 25/088 296/203.02 |
| 2015/0130223 A1 * | 5/2015 | Amemiya | B62D 25/088 296/193.09 |
| 2017/0313360 A1 * | 11/2017 | An | B62D 25/082 |

FOREIGN PATENT DOCUMENTS

| | | |
|---|---|---|
| DE | 102006008667 B4 | 10/2014 |
| DE | 102015005206 A1 | 10/2016 |
| EP | 2070807 B1 | 3/2011 |

* cited by examiner

*Primary Examiner* — Gregory A Blankenship

(74) *Attorney, Agent, or Firm* — Jason Rogers; Brooks Kushman P.C.

(57) ABSTRACT

A strut-tower brace includes a pair of strut-tower attachments, and front and rear cross members extending between the attachments. The rear cross member has a flange configured to connected with a vehicle cowl. A lattice structure interconnects the cross members and has ribs that are each joined to another of the ribs at a node that is spaced between the front and rear cross members.

19 Claims, 2 Drawing Sheets

US 10,144,456 B1

STRUT-TOWER BRACE

TECHNICAL FIELD

The present disclosure pertains to structural braces for motor vehicles and more specifically to strut-tower braces that interconnect the strut towers with each other and with a cowl of the vehicle.

BACKGROUND

Automobiles with unibody construction include strut towers that serve as upper attachment points for suspension struts. Many automobiles utilize a strut-tower brace that extends between the strut towers to improve lateral rigidity of the uni-body.

SUMMARY

According to one embodiment, a vehicle includes a cowl, strut towers, and a brace for stiffening the strut towers. The brace includes a pair of strut-tower attachments connected to the strut towers. Front and rear cross members extend between the attachments, and the rear cross member is attached to the cowl. A lattice structure interconnects the cross members and has ribs that are each joined to another of the ribs at a node that is spaced between the front and rear cross members.

According to another embodiment, a vehicle includes a vehicle body having a cowl and strut towers positioned forward of the cowl. A strut-tower brace has a cast-magnesium body. The cast-magnesium body includes a pair of strut-tower attachments connected to the strut towers and a front cross member extending between the attachments. A rear cross member extends between the attachments and is attached to the cowl. A lattice structure is disposed between and interconnects the cross members. The lattice structure includes ribs that are interconnected at a node. Each of the ribs has a first end connected to one of the front and rear cross members and a second end connected to the node. The node is disposed between, and spaced apart from, the front and rear cross members.

According to yet another embodiment, a strut-tower brace includes a pair of strut-tower attachments, and front and rear cross members extending between the attachments. The rear cross member has a flange configured to connected with a vehicle cowl. A lattice structure interconnects the cross members and has ribs that are each joined to another of the ribs at a node that is spaced between the front and rear cross members.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
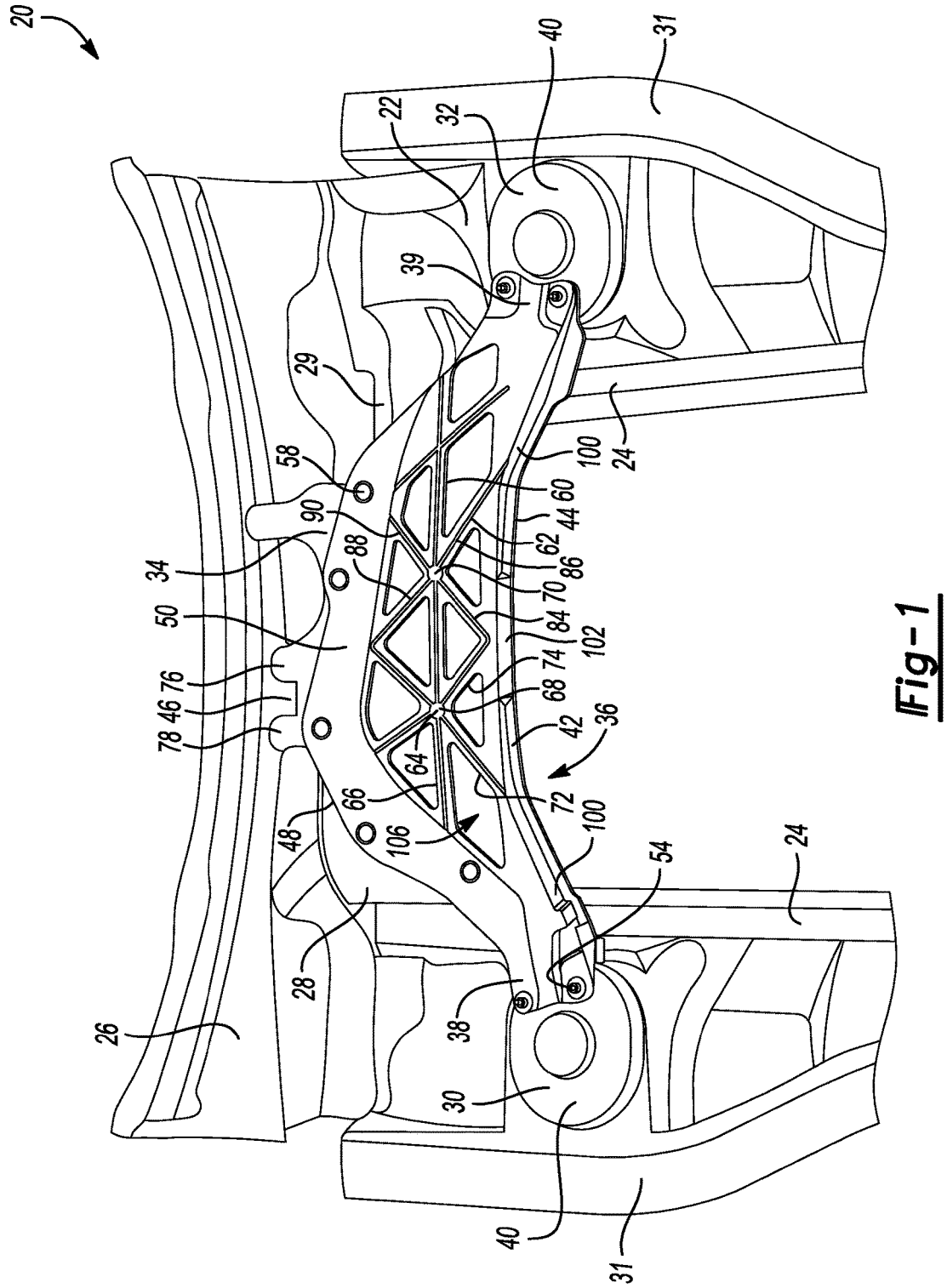
FIG. 1 is a top view of an engine compartment of a vehicle a strut-tower brace according to one embodiment of this disclosure.

Referring FIG. 1, a vehicle 20 includes a body structure 22 having a pair of frame rails 24 extending longitudinally, i.e., across a length of the vehicle, and a cowl 28 that is supported by the frame rails 24 and extends laterally, i.e., across a width of the vehicle 20. The cowl 28 separates the engine compartment from the passenger compartment. A dash panel 26 (partially shown) is connected to the cowl 28 and extends rearward into the passenger compartment. A bracket 34 may connect an upper portion 29 of the cowl 28 with the dash panel 26. A pair of shotgun rails 31 are connected to the cowl 28 and extend forward along opposing upper sides of the engine compartment. A passenger-side strut tower 30 and a driver-side strut tower 32 are located on opposing sides of the engine compartment, and each are connected to one of the rails 24 and one of the shotgun rails 31. The strut towers 30, 32 provide attachment points for the right and left suspension struts (not shown).

Figure 2:
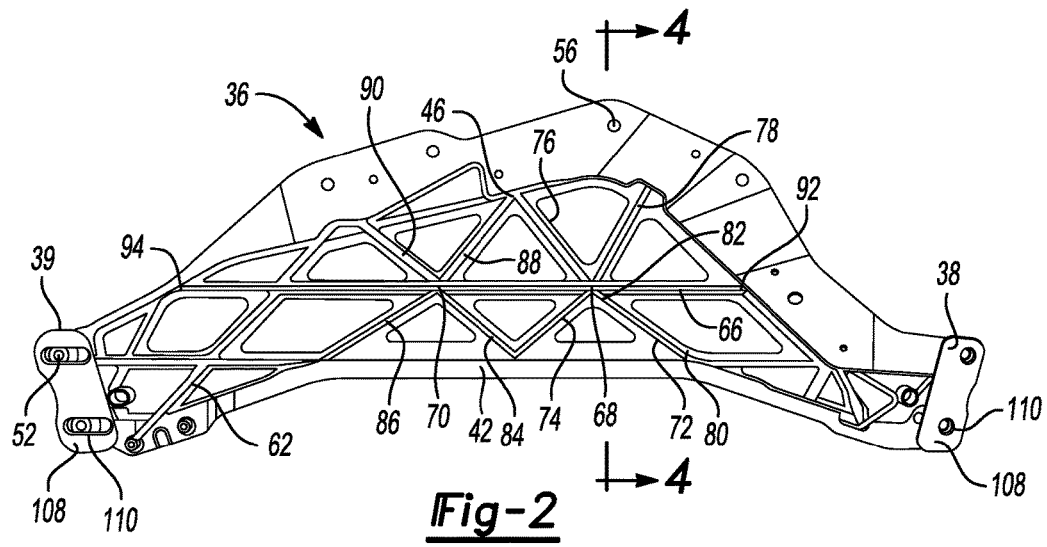
FIG. 2 is a bottom view of the strut-tower brace.

Referring to FIGS. 1 and 2, the vehicle 20 includes a strut-tower brace 36 that interconnects the strut towers 30, 32 with each other and interconnects the strut towers 30, 32 with the cowl 28. The strut-tower brace 36 reduces deflection of the strut towers to increase the lateral stiffness and the torsional stiffness of the strut towers and the front end of the vehicle. The brace 36 includes a pair of strut-tower attachments 38, 39 that are each connected to a top surface 40 of a corresponding strut tower 30, 32. The attachments 38, 39 may define holes 52 for receiving fasteners 54 that secure the attachments 38, 39 to the strut towers 30, 32. A front cross member 42 extends between the attachments 38, 39. A rear cross member 46 also extends between the attachments 38, 39 and generally defines a rear end 48 of the brace 36. The rear cross member 46 may define a flange 50 that connects with the cowl 28. The flange 50 defines a rear end 48 of the brace 36. The flange 50 defines a plurality of holes 56 that each receive a fastener 58 to secure the flange 50 to the cowl 28 and to the bracket 34. While the front cross member 42 extends generally straight across the engine compartment between the strut towers 30, 32, the rear cross member 46 has a curved shape in order to connect with the cowl 28. This causes the front and rear cross members 42, 46 to be spaced apart by a distance that varies along a longitudinal centerline of the brace. This distance is measured perpendicular to a lateral direction of the vehicle. The distance between the cross members is greater in the middle of the brace 36 than near the attachments 38 and 39. Near the attachments refers to any portion of the cross members with 20 centimeters of the attachments.

A lattice structure 60 interconnects the front cross member 42 and the rear cross member 46. The lattice structure 60 may include a plurality of ribs 62 interconnected by at least one node 64. The ribs 62 may be arranged to extend diagonally between the node 64 and the cross members 42, 46 to form one or more triangular spaces with the brace 36. A middle cross member 66 may extend through the lattice structure 60 and interconnect with the nodes 64 and with the rear cross member 46.

In the illustrated embodiment, the lattice structure 60 includes a first node 68 and a second node 70. The node 68 may have four associated ribs: a first rib 72, a second rib 74, a third rib 76, and a fourth rib 78. The first and second ribs 72, 74 may extend between the front cross member 42 and the node 68, and the third and fourth ribs 76, 78 may extend between the rear cross member 46 and the node 68. The node 70 may also have four associated ribs: a fifth rib 84, a sixth rib 86, a seventh rib 88, and an eighth rib 90. The fifth and sixth ribs 84, 86 may extend between the front cross member 42 and the node 70, and the seventh and eighth ribs 88, 90 may extend between the rear cross member 46 and the node 70. Each of the ribs may include a first end that is connected to one of the front or rear cross members and a second end that is connected to one of the nodes 68, 70. For example, the first rib 72 includes a first end 80 connected to the front cross member 42 and a second end 82 connected to the node 68. The middle cross member 66 may interconnect with the nodes 68, 70. The middle cross member 66 may include a first end 92 connected to a portion of the rear cross member 46 and a second end 94 connected to a second portion of the rear cross member 46.

Figure 3:
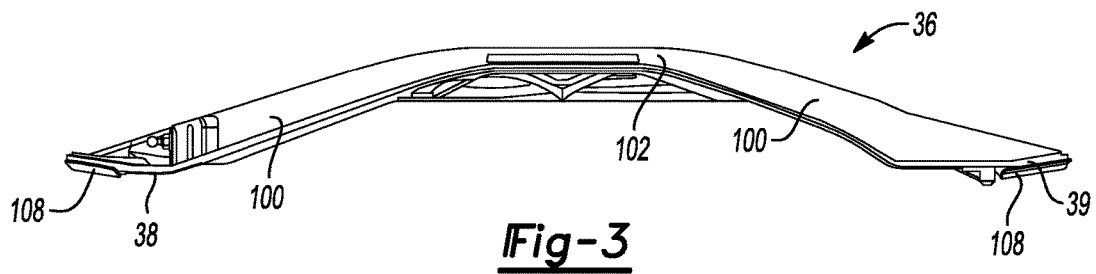
FIG. 3 is a front view of the strut-tower brace.
Figure 4:
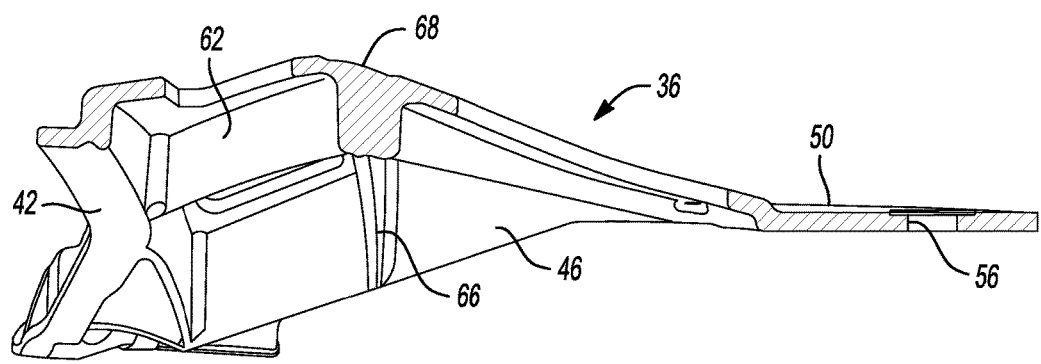
FIG. 4 is a side cross-sectional view of the strut-tower brace along cutline 4-4.

Referring to FIGS. 1, 3, and 4, forced induction, i.e., supercharging or turbo, is becoming increasingly popular on modern sports cars. Forced induction, especially supercharging, may increase the height of the engine above the top 40 of the strut towers. The straight-line brace, which was traditionally used, cannot be utilized in many modern sports cars as the engine is in the way. The strut-tower brace 36 may be domed to accommodate an engine having increased height. The attachments 38, 39 may be the lowest portion of the brace 36 and the nodes 68, 70 may be the highest component of the brace 36. The rear half of the brace 36 may slope downward to position the flange 50 below the nodes 68, 70.

The strut-tower brace 36 may also be slightly setback toward the cowl 28 to accommodate a supercharger that extends through the hood. The setback allows the brace 36 to sit behind the supercharger. The front cross member 42 may include a pair of rearward extending sections 100 and a generally straight section 102 connecting between the rearward extending sections 100. The angle of the sections 100 can be optimized to provide the desired setback for the brace 36, which will depend upon the specific dimensions of the engine, the location of the strut towers, and other factors.

Rather than being made of subcomponents that are separately formed and subsequently attached, the brace 36 may be made as a single die-cast part. In one embodiment, the brace 36 is made of die-cast magnesium-alloy. Magnesium alloy is 33% lighter than aluminum alloy and is of similar costs making it a suitable material for the strut-tower brace 36. Magnesium alloy, however, is 33% weaker than aluminum alloy. The strut-tower brace 36 overcomes this reduced material strength by employing the above described lattice structure 60, which distributes loads between the cross members 42, 46 via the ribs 62.

In addition to optimizing load distribution, the lattice structural 60 also provides openings 106 defined between the ribs 62 and cross members 42, 46, 66 allowing air to flow through the brace 36. The openings 106 also provide hand access to engine components located below the brace. The lattice structure 60 may further provide attachment areas for vehicle components such as the degas bottle, fluid reservoirs, and the oil dipstick.

Galvanic corrosion may occur if magnesium is directly connected to steel. An isolator must be employed to prevent corrosion at magnesium-steel interfaces. Referring to FIG. 2, isolator plates 108 may be installed between the steel strut towers 30, 32 and the magnesium strut-tower attachments 38, 39. The isolator plates 108 may be thin metal stampings formed of a material that does not react with magnesium or steel such as aluminum. The isolator plates 108 may defines fastener holes 110 that align with the holes 52 defined in the attachments 38, 39. While not shown, another isolator plate may be disposed between the cowl 28 and the flange 50 if the cowl 28 is steel.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A vehicle comprising:
   a cowl;
   strut towers; and
   a brace including:
      a pair of strut-tower attachments connected to the strut towers,
      front and rear cross members extending between the attachments, the rear cross member being attached to the cowl, and
      a lattice structure interconnecting the cross members and having ribs that are each joined to another of the ribs at a node that is spaced between the front and rear cross members, wherein each of the ribs extends obliquely from one of the front and rear cross members and cooperates with another of the ribs and the one of the front and rear cross members to define a space within the brace.

2. The vehicle of claim 1, wherein the ribs include a first rib having a first end connected to the front cross member and a second end connected to the node, and a second rib having a first end connected to the rear cross member and a second end connected to the node.

3. The vehicle of claim 1, wherein the ribs include first, second, third, and fourth ribs all interconnected at the node, and wherein the first and second ribs extend between the front cross member and the node, and the third and fourth ribs extend between the rear cross member and the node.

4. The vehicle of claim 3, wherein the ribs further include fifth, sixth, seventh, and eighth ribs interconnected at a second node, wherein the fifth and sixth ribs extend between the front cross member and the second node, and the seventh and eighth ribs extend between the rear cross member and the second node.

5. The vehicle of claim 4 further comprising a middle cross member extending through the lattice structure and intersecting the node and second node.

6. The vehicle of claim 5, wherein the middle cross member has opposing ends each connected to the rear cross member.

7. The vehicle of claim 1, wherein the node is higher than the attachments and is higher than the rear cross member.

8. The vehicle of claim 1, wherein the brace further includes a middle cross member extending between the rear cross member and intersecting the node.

9. The vehicle of claim 1, wherein the front and rear cross members are spaced apart by distances that vary along a longitudinal centerline of the brace.

10. The vehicle of claim 1, wherein the space within the brace has a triangular shape.

11. The vehicle of claim 1, wherein the brace is formed of cast magnesium alloy.

12. A vehicle comprising:
    a vehicle body including a cowl and strut towers positioned forward of the cowl; and a strut-tower brace having a cast-magnesium body including:
- a pair of strut-tower attachments connected to the strut towers,
- a front cross member extending between the attachments,
- a rear cross member extending between the attachments and attached to the cowl, wherein the front and rear cross members are spaced apart at greater distance in a middle of the strut-tower brace than near the attachments, and
- a lattice structure disposed between and interconnecting the cross members, the lattice structure including ribs interconnected at a node, each of the ribs having a first end connected to one of the front and rear cross members and a second end connected to the node, wherein the node is disposed between, and spaced apart from, the front and rear cross members.

13. The vehicle of claim 12, wherein the ribs include a first rib having a first end connected to the front cross member and a second end connected to the node, and a second rib having a first end connected to the rear cross member and a second end connected to the node.

14. The vehicle of claim 13, wherein the lattice structure further includes a second node and additional ribs each having a first end connected to one of the front and rear cross members and a second end connected to the second node.

15. The vehicle of claim 14, wherein the lattice structure further includes a middle cross member interconnecting the node and the second node.

16. The vehicle of claim 12 further comprising isolator plates each disposed between the attachments and the strut towers, wherein the isolator plates are formed of a material that is different than the strut-tower brace and the strut towers.

17. A strut-tower brace comprising:
- strut-tower attachments;
- front and rear cross members extending between the attachments, wherein the rear cross member is connectable with a vehicle cowl; and
- a lattice structure interconnecting the cross members and having ribs that are each joined to another of the ribs at a node that is spaced between the front and rear cross members, wherein the node is higher than the attachments and is higher than the rear cross member.

18. The vehicle of claim 17, wherein the ribs include a first rib having a first end connected to the front cross member and a second end connected to the node, and a second rib having a first end connected to the rear cross member and a second end connected to the node.

19. The vehicle of claim 17, wherein the ribs include first, second, third, and fourth ribs all interconnected at the node, and wherein the first and second ribs extend between the front cross member and the node, and the third and fourth ribs extend between the rear cross member and the node.

* * * * *